(12) United States Patent
Meijer

(10) Patent No.: US 6,240,712 B1
(45) Date of Patent: Jun. 5, 2001

(54) BALE COLLECTOR

(75) Inventor: Thomas H. D. Meijer, Ten Post (NL)

(73) Assignee: Meijer Ten Post Beheer B.V. (NL)

( * ) Notice: Subject to any disclaimer, the term of this patent is extended or adjusted under 35 U.S.C. 154(b) by 0 days.

(21) Appl. No.: 09/429,961

(22) Filed: Oct. 29, 1999

Related U.S. Application Data

(63) Continuation of application No. PCT/NL98/00182, filed on Jan. 14, 1998.

(30) Foreign Application Priority Data

May 2, 1997 (NL) .................................................... 1005960

(51) Int. Cl.$^7$ ............................. A01D 39/00; A01D 90/10
(52) U.S. Cl. .......................... 56/16.4 R; 56/341; 100/88; 414/24.5
(58) Field of Search .................................. 100/88, 87, 5, 100/89; 56/341, 16.4 R, 344; 280/490.1, 494; 414/24.5, 24.6, 111, 546, 551, 685, 911, 789.7

(56) References Cited

U.S. PATENT DOCUMENTS

| 4,815,266 | * | 3/1989 | Ratzlaff et al. | ......................... 56/341 |
| 5,257,885 | * | 11/1993 | Reil | ..................................... 414/24.5 |
| 5,263,410 | * | 11/1993 | Olin | ....................................... 100/88 |
| 5,316,426 | * | 5/1994 | Dwyer et al. | ....................... 414/24.5 |
| 5,664,923 | * | 9/1997 | Olin | ................................... 414/24.5 |
| 5,954,468 | * | 9/1999 | Marshall | ............................. 414/24.5 |

FOREIGN PATENT DOCUMENTS

| 0 110 056 A2 | 6/1984 | (EP) . |
| 0 309 938 A1 | 4/1989 | (EP) . |
| 0 404 668 A1 | 12/1990 | (EP) . |
| 2 472 908 A1 | 7/1981 | (FR) . |

* cited by examiner

*Primary Examiner*—Robert E. Pezzuto
(74) *Attorney, Agent, or Firm*—Todd Deveau; Troutman Sanders LLP

(57) ABSTRACT

Bale collector having a mobile frame for connecting behind a bale delivery device, such as a baler, by which round bales can be deposited at desired points on the land. The bale collector provides a storage place for a single round bale, a non-return element for preventing rolling back of the bale from the rear and a tilt control element connected between the frame and the rear bearing part for tilting a rear end of the rear bearing part between an upper position of a collecting state and a lower position of an unloading state.

9 Claims, 4 Drawing Sheets

BALE COLLECTOR

This is a continuation application of PCT/NL98/00182 filed Jan. 4, 1998.

FIELD OF THE INVENTION

The invention relates to a bale collector according to the preamble of claim 1. The bale delivery device behind which the bale collector is connected is, for example, a baler or a wrapping device for wrapping each bale in a film.

BACKGROUND OF THE INVENTION

A bale collector of this type is known, for example, from European Patent Application EP-A-0,622,011. The known collector is used for collecting several round bales which, after collection thereof on the collector, can be deposited at a suitable point on the ground.

The known bale collector has the disadvantage that it is complex and therefore susceptible to breakdown, and is expensive. Furthermore, the known bale collector is large both in length and height, which limits its manoeuvrability, and this makes working with it difficult and can cause unsafe situations both on the land and on the public highway. The large dimensions of the known bale collector are also a disadvantage for the periods during which the collector has to be stored when not in use, when it takes up a large amount of valuable space.

SUMMARY OF THE INVENTION

The object of the invention is to eliminate the disadvantages of the known bale collector.

In addition, the inventor realized the desirability of a compact, simple and cheap bale collector, by means of which round bales can be deposited at desired points on the land with the greatest possible usable margin between the point where the bale is ready and the point where the bale is to be deposited on the ground.

The above objectives are achieved according to the invention by means of the bale collector according to claim 1.

The bale collector according to the invention provides a storage place for a single round bale, which can be deposited at a desired point on the land while the bale delivery device is preparing the next bale. The desired point can lie within a margin of more or less half the distance which there would be between bales deposited directly from the baler onto the land. On the other hand, if depositing a bale on the ground is delayed until the bale delivery device has the next bale almost ready, and if these two bales are subsequently deposited on the ground shortly after one another, pairs of bales can be deposited on the ground at twice the above distance from each other. This means that it is possible to deposit the bales on the land within a large mutual distance range and according to a desired formation, in such a way that subsequent loading of the bales onto a transport vehicle is facilitated.

BRIEF DESCRIPTION OF THE DRAWINGS

The invention is explained below with reference to the appended drawings, in which.

DESCRIPTION OF THE PREFERRED EMBODIMENT

Figure 1:
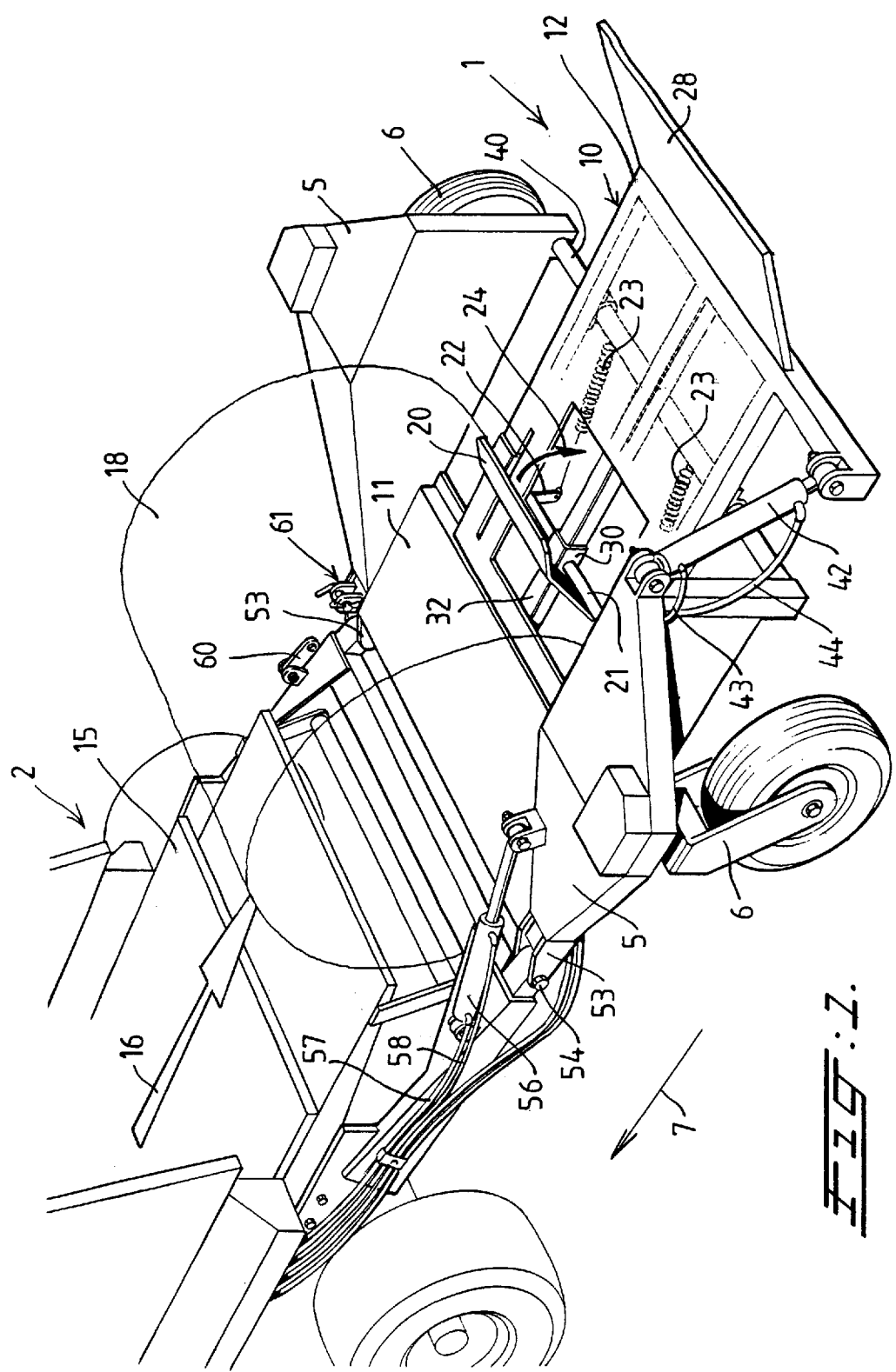
FIG. 1 shows a perspective view of a preferred embodiment of a bale collector according to the invention with a bale thereon in a front position coming from a baler.

FIG. 1 shows in perspective a view of a bale collector 1 which is connected behind a baler 2. The bale collector 1 comprises a frame 5, to which two swivelling wheels 6 are fixed. During operation the bale collector 1 is pulled along by the baler 2 in a travel direction 7. A bearing platform 10, comprising a front part 11 and a rear part 12, is fitted on the frame 5 between the two swivelling wheels 6. By way of an outlet 15 thereof, the baler 2 delivers backwards in a direction 16 and onto the bearing platform 10 a disc-shaped round bale 18, an axis of which runs parallel to the ground and crosswise to the travel direction 7. The rear bearing part 12 has an upwardly projecting non-return flap 20 which is rotatable about a shaft 21 which has downwardly projecting arms 22. Tension springs 23 are fixed between the ends of the arms 22 and the frame 5.

When the baler 2 ejects a bale 18 in the direction 16, the bale 18 will roll in succession onto the front bearing part 11 and against the non-return flap 20, with the result that the non-return flap 20 rotates against the action of the springs 23 in the direction of the arrow 24, so that the bale 18 rolls over the flap 20 and behind it. Further rolling of the bale 18 is prevented by a retaining panel 28.

The non-return flap 20 is fitted on a construction with a tubular piece 30 which is slidable parallel to the travel direction 7 over a suitable pipe 32 of the rear bearing part 12. The construction for the flap 20 can be slid into and fixed in such a position that, after a bale 18 has passed the flap 20 towards the rear, the flap 20 can rotate upwards again, as indicated by an arrow 35 in FIG. 2, and the bale 18 is subsequently retained between the flap 20 and the retaining panel 28.

The rear bearing part 12 is rotatable about a shaft 40 which is parallel to the ground and crosswise to the travel direction 7 and is fitted between the flap 20 and the retaining panel 28.

The rear bearing part 12 is held in a horizontal bearing position by a cylinder 42 mounted between the frame 5 and the rear bearing part 12. The cylinder 42 is fed by way of lines 43, 44 from a tractor (not shown) connected in front of the baler.

Figure 3:
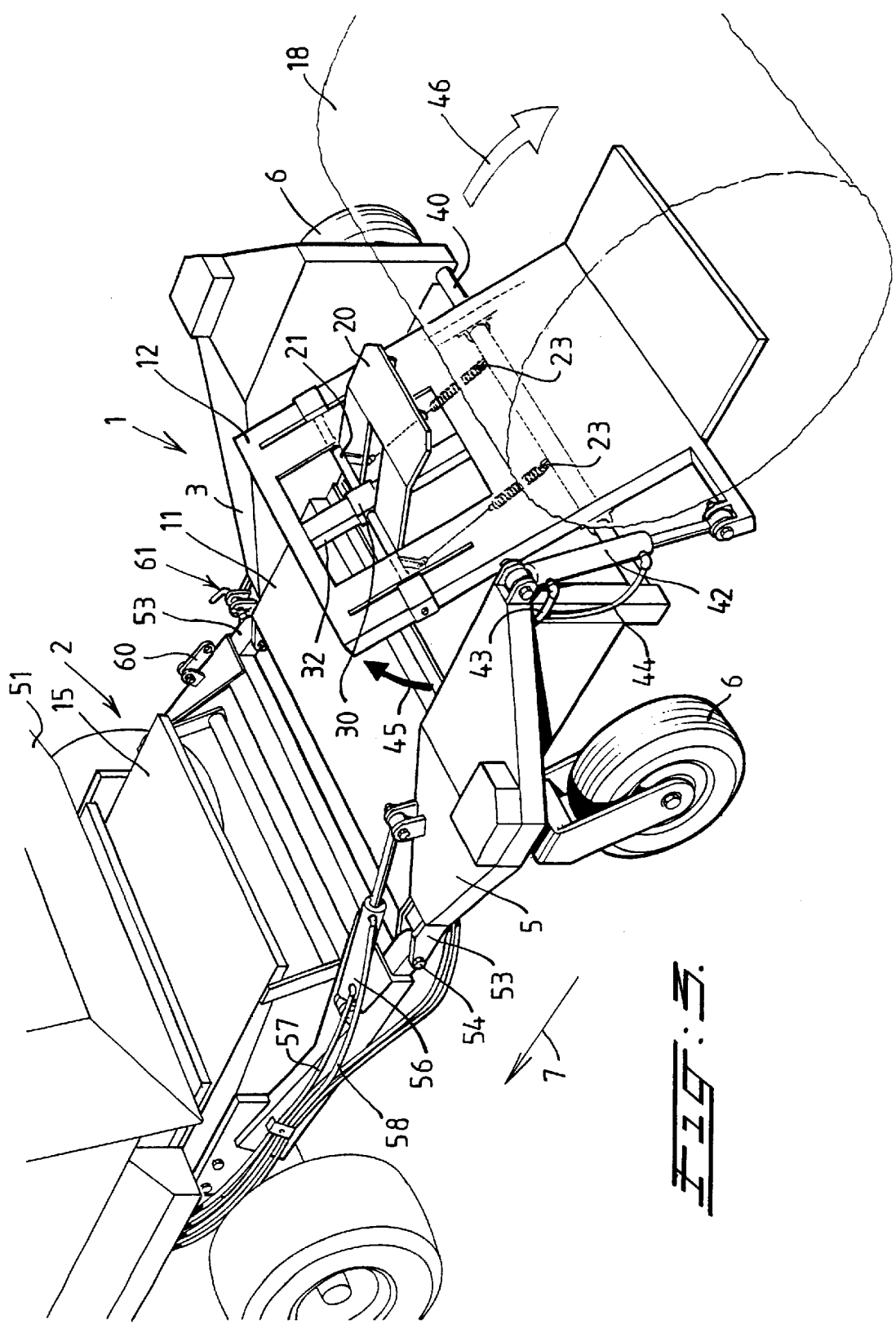
FIG. 3 shows in perspective a view of the bale collector and the baler according to FIGS. 1 and 2 in a depositing position.

When a bale 18 is situated on the rear bearing part 12, and the bale collector 1 is situated at a desired point on the land, the driver of the baler 2 operates the cylinder 42, which causes the rear bearing part 12 to rotate in the direction of the arrow 45, i.e. with the retaining panel 28 towards the ground, as shown in FIG. 3. The bale 18 consequently rolls off the rear bearing part 12 according to the arrow 46 over the retaining panel 28 and onto the ground. The driver then operates the cylinder 42, in order to rotate the rear bearing part 12 back to its previous position.

The bale collector acts as a buffer for a bale 18, which can be deposited on the land at a desired point of the travel route so long as the baler 2 is not ejecting the next bale. If the bale collector 1 deposits a bale 18 on the ground when the baler 2 has the next bale half ready, the result is that for the point for depositing the next bale a margin of more or less half the distance at which the bales would be deposited on the ground directly from the baler 2 is obtained. On the other hand, if the depositing of a bale on the ground is delayed until the baler 2 is almost ready with the next bale, and if these two bales are then deposited on the ground shortly after one another, pairs of bales situated at twice the above distance from each other can be deposited on the ground. By using the bale collector 1 according to the invention, the bales 18 can therefore be deposited accurately at desired points, for example in such a way that neat rows of bales 18 can be deposited on the land both parallel to the travel direction 7 of the baler 2 and crosswise thereto. This facilitates loading of the bales 18 deposited on the land onto a transport vehicle.

Other advantages of the bale collector 1 according to the invention are that the collector 1 is compact, simple and cheap.

Figure 4:
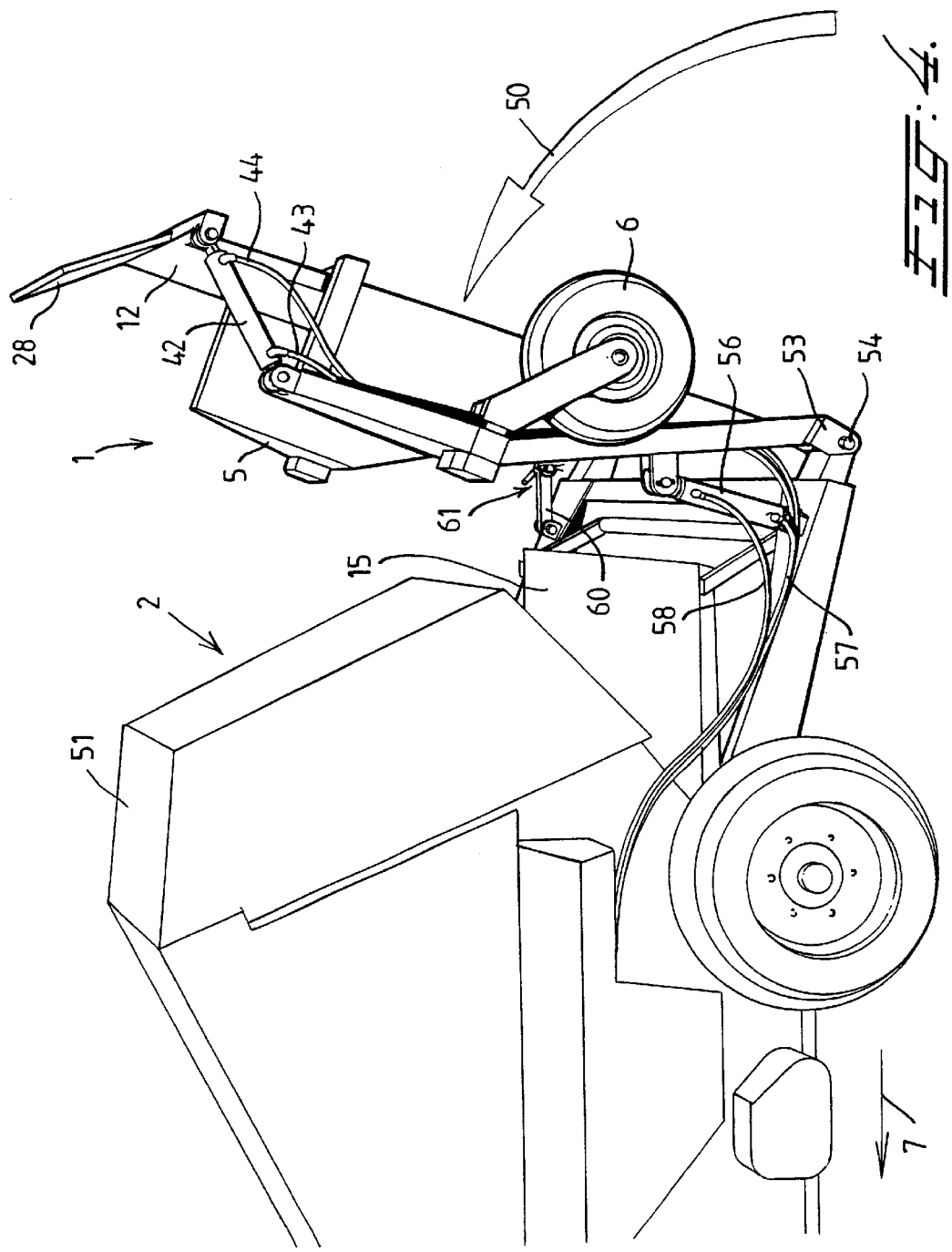
FIG. 4 shows in perspective a view of the combination of the bale collector and the baler according to the preceding figures, with the bale collector in an idle, swung-up position.

The advantage of the compactness, with a short length parallel to the travel direction 7, makes it possible for the bale collector 1, as shown in FIG. 4, to be transported on the back of the baler 2 in an upward swung position according to an arrow 50 opposite the outlet 15 of the baler 2 shut off by a cap 51. This makes transportation of the combination of the bale collector 1 and the baler 2 easier and safer both on the land and on the public highway.

Figure 2:
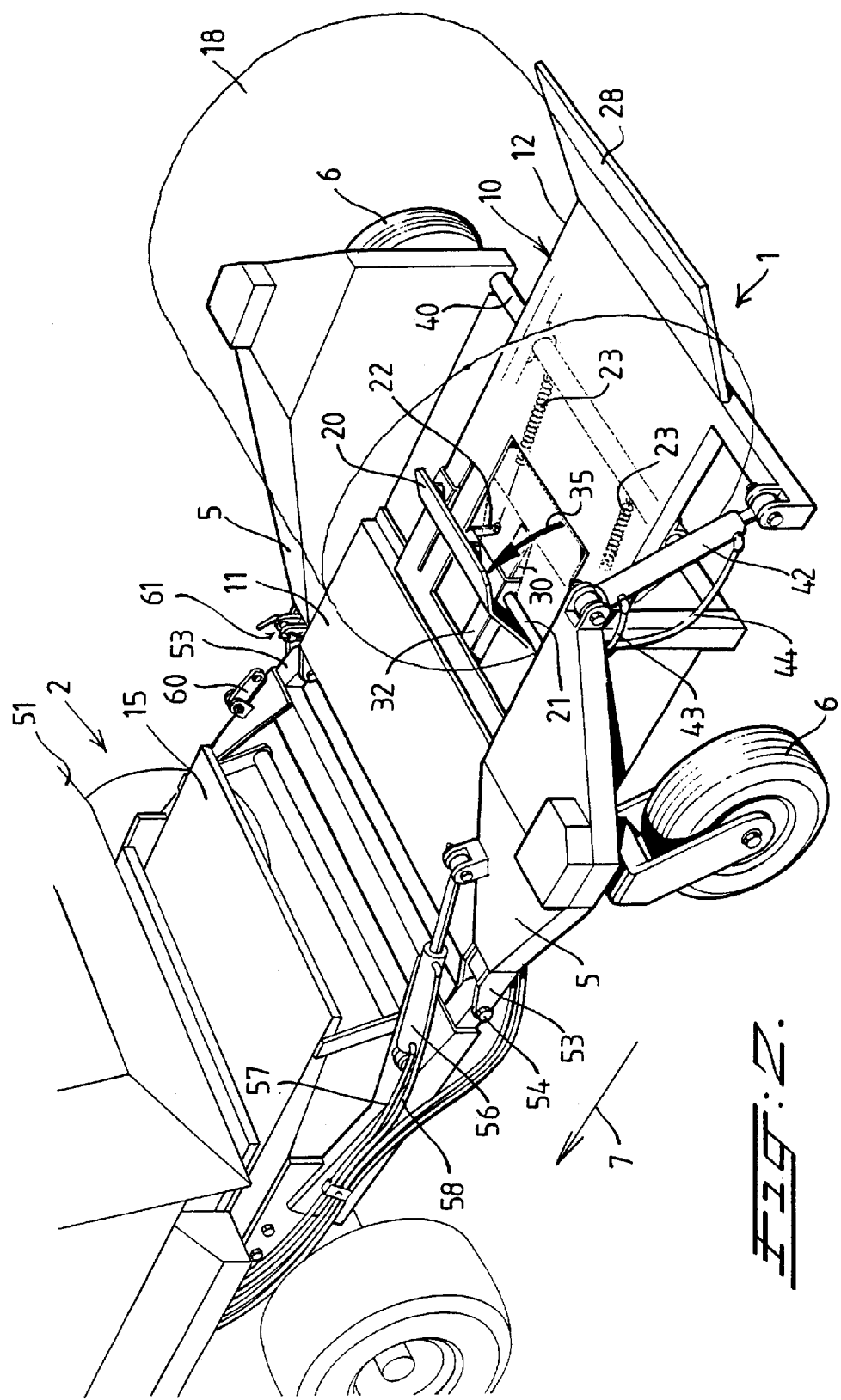
FIG. 2 shows in perspective a view like that of FIG. 1, but with the bale in a rear position.

In order to reach the position of the bale collector 1 shown in FIG. 4, the collector 1 and the baler 2 have two fork couplings 53, each with a shaft 54 whose axes coincide. A cylinder 56, which is fed by way of lines 57, 58 from the abovementioned tractor (not shown), is fitted between the bale collector 1 and the baler 2. When the cylinder 56 is extended, the bale collector 1 is in a working position as shown in FIGS. 1, 2 and 3, and in a retracted position of the cylinder 56 the idle position of the bale collector 1 shown in FIG. 4 is obtained. The idle position can be locked by means of locking means 60, 61.

Various modifications are possible for an expert within the scope of the invention.

For example, the bearing platform 10 can consist of a tubular construction without cover plate.

Instead of the tension springs 23, one or more compression springs can be fitted between the frame 5 and the flap 20. Moreover, instead of the springs 23, a counterweight can be fitted on the ends of the arms 22, for example a pipe filled with a heavy material and running parallel to the ground.

Furthermore, the slide construction 30, 32 with the non-return flap 20 can be fitted on the frame 5 in a location such as that shown in FIGS. 1 and 2, instead of on the rear bearing part 12. The last-mentioned and illustrated embodiment has the advantage that when the rear bearing part 12 tilts according to the arrow 45 in FIG. 3 it is better ensured that a bale 18 rolls off the rear bearing part 12 onto the ground, for example when the combination of baler 2 and bale collector 1 is travelling down a slope.

In addition, the construction with the non-return flap 20 can be replaced or supplemented by non-return means which act upon the side edges of a passing bale 18. For this purpose, such a construction as the construction shown can be used, but in which the axis of rotation is vertical.

Furthermore, for the cylinders 42 and 56 other means can be used to rotate the rear bearing part 12 relative to the frame 5 or the frame 5 relative to the baler 2. Even fully hand-operated means can be used. Alternatively, instead of the cylinder 42, it is possible to fit a locking mechanism of which parts are fitted on the frame 5 or the bearing part 12, the mechanism being self-locking when the bearing part 12 is rotated into the highest position of the rear part thereof, which can be achieved by a suitable position of the centre of gravity of the bearing part 12 under its own weight, while when the operator unlocks the mechanism the bearing part 12 with a bale 18 supported thereon rotates under its own weight to the ground. The rotation back to the ground can be promoted by using a tension spring fitted between the frame 5 and the bearing part 12.

With a suitable length of the bearing part 12, viewed in the travel direction 7, several constructions with a non-return flap, such as the flap 20, can be fitted, in which case a bale 18 can also be retained between two adjacent non-return flaps 20. When the bearing part 12 is rotated downwards, all bales 18 will roll off the bearing part 12 onto the ground.

Although the bale collector 1 according to the invention is explained for use behind a baler 2, the bale collector can also be used for other types of bale delivery devices, for example behind a wrapping device which wraps each bale in a film and ejects film-wrapped bales through a delivery opening to the bale collector 1.

What is claimed is:

1. Bale collector comprising a mobile frame having wheels and which is suitable for being connected to a bale delivery device behind a bale delivery outlet of the bale delivery device viewed in a collecting travel direction, bale bearing means with a rotatably rear bearing part fitted on the frame and suitable for receiving and supporting a disc-shaped round bale rolling from the outlet of the bale delivery device, means fitted at the rear end of the frame for retaining a bale supported on the rear bearing part, non-return means having a rotatably non-return element with a horizontal axis and with resetting means which are suitable for allowing a bale rolling to the rear in a bale passing by position of the non-return element, and tilt control means connected between the frame and the rear bearing part for tilting a rear end of the rear bearing part between an upper position of a collecting state and a lower position of an unloading state, wherein the axis of rotation of the non-return element is arranged at the rear of the wheels and the non-return element is rotatable from the bale passing by position downwards to the bearing part for allowing a bale to roll over the bearing part to the rear.

2. Bale collector according to claim 1, wherein the position of the non-return means is adjustable parallel to the travel direction.

3. Bale collector according to claim 1, wherein a rotating shaft for the bearing part is fitted between the non-return means and the retaining means.

4. Bale collector according to claim 1, wherein the tilt control means comprise a locking mechanism, parts of which are fixed on the frame and the rear bearing part, the shaft fitted in such a position that when the locking mechanism is unlocked the bearing part with a bale thereon rotates under its own weight to the ground and rotates back up after the bale has rolled off the bearing part onto the ground, and locks the locking mechanism.

5. Bale collector according to claim 4, wherein the return movement of the bearing part is promoted by a spring fitted between the frame and the bearing part.

6. Bale collector according to claim 5, comprising several non-return means which, viewed in the travel direction, are fitted one after the other, for supporting bales on the bearing part between adjacent non-return means.

7. Bale collector according to claim 4, wherein the frame has at its front side a forked coupling piece which is suitable for interaction with a forked coupling piece of the baler, with a common rotary shaft parallel to the ground and perpendicular to the travel direction, and further control means connected to the frame, suitable for connecting to the baler so that the bale collector can be rotated in a direction opposite the press outlet of the baler into an idle position or working position.

8. Bale collector according to claim 7, wherein the further control means comprise one or more cylinders.

9. Bale collector, comprising a mobile frame having wheels and which is suitable for being connected to a bale delivery device behind a bale delivery outlet of the bale delivery device viewed in a collecting travel direction, a bale bearing platform with a rotatably rear bearing part fitted on the mobile frame and capable of receiving and supporting a disc-shaped round bale rolling from the outlet of the bale delivery device, a bale retaining member fitted at the rear end of the mobile frame capable of retaining a bale supported on the rear bearing part, a non-return member having a rotatably non-return element with a horizontal axis and springs which is capable of allowing a bale rolling to the rear in a bale passing by position of the non-return element, and a tilt control device connected between the frame and the rear bearing part for tilting a rear end of the rear bearing part between an upper position of a collecting state and a lower position of an unloading state, wherein the axis of rotation of the non-return element is arranged at the rear of the wheels and the non-return element is rotatable from the bale passing by position downwards to the bearing part for allowing a bale to roll over the bearing part to the rear.

* * * * *